(12) United States Patent
Gabrys et al.

(10) Patent No.: US 11,670,987 B1
(45) Date of Patent: Jun. 6, 2023

(54) HIGH SPECIFIC POWER ELECTRICAL MACHINE

(71) Applicants: Christopher W. Gabrys, Reno, NV (US); Timothy S. Rodgers, Bainbridge Island, WA (US)

(72) Inventors: Christopher W. Gabrys, Reno, NV (US); Timothy S. Rodgers, Bainbridge Island, WA (US)

( * ) Notice: Subject to any disclaimer, the term of this patent is extended or adjusted under 35 U.S.C. 154(b) by 0 days.

(21) Appl. No.: 17/153,058

(22) Filed: Jan. 20, 2021

Related U.S. Application Data

(63) Continuation-in-part of application No. 16/989,646, filed on Aug. 10, 2020, now Pat. No. 11,502,569.
(Continued)

(51) Int. Cl.
*H02K 9/20* (2006.01)
*H02K 9/18* (2006.01)
(Continued)

(52) U.S. Cl.
CPC ............... *H02K 9/20* (2013.01); *H02K 9/18* (2013.01); *H02K 9/19* (2013.01); *H02K 21/22* (2013.01)

(58) Field of Classification Search
CPC .. H02K 9/20; H02K 9/18; H02K 9/19; H02K 21/22; H02K 1/2786; H02K 1/187;
(Continued)

(56) References Cited

U.S. PATENT DOCUMENTS

| | | | |
|---|---|---|---|
| 7,443,066 B2 * | 10/2008 | Salamah | F03D 9/25 310/64 |
| 7,525,230 B1 * | 4/2009 | Gabrys | H02K 21/14 310/260 |

(Continued)

*Primary Examiner* — Alexander A Singh
(74) *Attorney, Agent, or Firm* — J. Michel Neary

(57) ABSTRACT

An electric machine for converting between electrical and rotary mechanical energy includes a rotor that is journalled to rotate about an axis of rotation, and an adjacent stator that magnetically exerts torque upon the rotor across a magnetic airgap in response to applied electric power to air core stator windings that are bonded in thermal contact to a slotless ferromagnetic stator backiron forming the stator surface facing the magnetic airgap, the rotor has a surface that is opposed to, and spaced apart from, the corresponding surface on the stator, the rotor surface and the stator surface define the airgap therebetween. The rotor has permanent magnets that generate magnetic flux across the magnetic airgap and through the air core stator windings. The air core windings are cooled by a physical loop having an evaporator, a remote located condenser and connected by two fluid flow lines filled with two phase fluid comprising liquid and gas both traveling in the same direction around the physical loop. The evaporator is constructed as an annulus co-annular with the rotor and located in thermal contact with the stator backiron and in thermal conduction indirectly with heat across the bond of the air core stator windings and through the stator backiron as heat is generated from the application of electric power; The evaporator transfers heat from the stator backiron to the fluid through phase change energy of the fluid, and the fluid is passively circulated to the con-
(Continued)

denser where the phase change energy is released remotely by convection of heat to ambient air, wherein the condenser is located at a higher elevation than the stator and the evaporator has two internal parallel fluid paths located on opposite diametral sides of the stator.

21 Claims, 13 Drawing Sheets

Related U.S. Application Data

(60) Provisional application No. 63/038,842, filed on Jun. 14, 2020, provisional application No. 62/984,200, filed on Mar. 2, 2020, provisional application No. 62/966,547, filed on Jan. 28, 2020, provisional application No. 62/963,518, filed on Jan. 20, 2020.

(51) Int. Cl.
*H02K 21/22* (2006.01)
*H02K 9/19* (2006.01)

(58) Field of Classification Search
CPC .......... H02K 1/18; H02K 1/182; H02K 1/185; H02K 9/00; H02K 9/02; H02K 9/04; H02K 9/06; H02K 9/08; H02K 9/10; H02K 9/12; H02K 9/14; H02K 9/16; H02K 9/22; H02K 9/225; H02K 3/00; H02K 3/22; H02K 3/47; H02K 21/12
USPC ..... 310/52, 53, 54, 57, 58, 59, 60 R, 62, 63, 310/60 A, 64
See application file for complete search history.

(56) References Cited

U.S. PATENT DOCUMENTS

2011/0025152 A1* 2/2011 Lafontaine ............... H02K 9/19
310/90
2021/0152052 A1* 5/2021 Haran .................... H02K 21/22

* cited by examiner

HIGH SPECIFIC POWER ELECTRICAL MACHINE

This invention pertains to electric machines for converting between electrical and mechanical energy, and more particularly to a new electric machine that provides increased power capability per weight and for long duration. The increased specific power is made possible through a unique combination of minimizing the heat generation through a very high efficiency energy conversion construction that also simultaneously maximizes the removal of heat loss energy through a very high efficiency thermal energy transmission construction.

BACKGROUND OF THE INVENTION

Currently, there is a great need for new higher specific power electric machines. These electric machines must not only be able to provide high power energy conversion capability for instantaneous periods, but must also be able to efficiently provide it for extended periods of time.

Development of such new electric machines could potentially enable practical electrically-powered manned aviation. They could also significantly increase the performance, reduce the weight and extend the ranges of existing electrically-powered ground vehicles, including through use in-wheel motors. Such electric machines could provide benefits to any vehicles that utilize electrical power for propulsion, whether manned or unmanned. There may also be other beneficial applications for use as industrial motors or generators.

Unfortunately, such high specific power electric machines have not existed. To date, most electric machines have not achieved high power capability per weight. Some electric machines have been able to achieve relatively high specific power capability, but being only sustainable either for very brief periods of time, or by requiring a significantly large additional power consumption for thermal management, making use of high specific power capability impractical. Accordingly, a new high specific power electrical machine is needed that both achieves higher power conversion per weight and can also sustain this high specific power for extended duration of time.

SUMMARY OF THE INVENTION

The invention provides a sustainable high specific power density electric machine. Permanent magnet, air core electric machines can be fabricated to yield the highest possible power densities and efficiencies, if properly designed. However, the duration of high specific power capability has to date been substantially limited by heat generation and thermal management, and this significantly limits the applications the applications for these machines. Extended duration operation at high power can increase windings temperature by more than 100° C. and increase resistive power loss by as much as 40% or more, further limiting power density capability that can be sustained. New sustainable high specific power electric machines must be designed for simultaneously having the highest efficiency for minimized heat power generation, with high dielectric strength for high voltage operation, and lowest thermal resistance construction from the air core windings in the magnetic airgap to remote ambient air, and all with total system minimized weight. One type of air core electric machines utilizing a double rotor topology can provide the highest possible efficiency with highest dielectric strength, however they provide much too high of a thermal resistance heat path from the windings and not to a remote location, and are subsequently not the desired solution. Surprisingly, we have found that with a unique combination of elements, a new electric motor-generator can be constructed for providing a sustained higher specific power capability of more 17.4 kW/kg, or than twice that of the highest rated current electric machines.

The electric machine comprises a rotor that is journalled to rotate about an axis of rotation, and a stator is stationary adjacent to the rotor and magnetically exerts torque upon the rotor across a magnetic airgap in response to applied electric power. The rotor comprises permanent magnets that generate magnetic flux across the magnetic airgap and through air core stator windings that are bonded in thermal contact to a slotless ferromagnetic stator backiron on the surface facing the magnetic airgap. The air core windings are comprised of pre-bundled multiple individually insulated conductor strands that are electrically connected in parallel but are electrically insulated from each other along their lengths inside the magnetic airgap where bonded to the stator backiron. The air core windings are cooled by a physical loop having an evaporator, a remote located condenser and connected by two fluid flow lines filled with two phase fluid comprising liquid and gas both traveling in the same direction around the physical loop. The evaporator is constructed as an annulus co-annular with the rotor and located in thermal contact with the stator backiron and in thermal conduction indirectly with heat across the bond of the air core stator windings and through the stator backiron as heat is generated from the application of electric power. The evaporator transfers heat from the stator backiron to the fluid through phase change energy of the fluid, and the fluid is passively circulated to the condenser where the phase change energy is released remotely by convection of heat to ambient air, wherein the condenser is located a higher elevation than the stator and the evaporator comprises two internal parallel fluid paths located on opposite diametral sides of the stator. This construction provides for the highest power density combined with high efficiency and simultaneously provides the lowest thermal resistance from the air core armature windings generating the resistive heating to high transfer efficiency, remote located heat energy discharge.

In a preferred embodiment of the invention, the speed capability of the rotor and resulting power capability of the motor is increased through use of an outer rotor construction whereby the magnetic armature airgap is minimized as the rotor magnets are contained by an outer rotor backiron located away from the air gap. With this embodiment, the electric machine is constructed with the stator located radially inside the rotor, the rotor is supported by a hub located on only one axial end and the loop transfers heat energy out the opposite end as the hub by flowing out the internal cavity of the electric machine to the remote condenser. The thermal resistance from the stator windings generating heat to the condenser is minimized while the electric machine specific power (power density) is maximized.

In an additional embodiment of the invention, the electric machine transfers stator resistive heat energy from a lower surface area density at the stator to a higher surface area density at the condenser. The surface area of the combined condenser fins is greater than the surface area of the stator backiron, which allows heat transfer to remote ambient air to be highly efficient and greatly reduces the temperature increase of the air core stator windings. This configuration maintains temperatures far below that which is possible by simply adding fins directly to the housing. The condenser is much more easily fabricated to have a a higher surface area density of thin foil fins for maximum convective heat transfer to ambient air.

The total thermal resistance from the source of heat generation which is the air core stator windings to the ambient air is critical to maintaining sustained highest possible specific power capability. This also includes the transfer from the windings conductor strands to the stator backiron. For maximum power capability, the dielectric strength between windings and between the windings and the stator backiron is preferably maintained high. We have found that the highest dielectric strength capability per thermal resistance is achieved by using a serve of dielectric films to wrap the strands, as opposed to extruded or other types. In a further embodiment, the pre-bundled multiple individually insulated conductor strands are wrapped with a dielectric film which is bonded directly to the stator backiron. A two layer wrap of polyimide film results in a high thermal conductivity with minimal thickness of only 0.002". At the same time, it provides a dielectric strength of 20.7 kV between adjacent windings and a dielectric strength of 33.0 kV between windings and the stator backiron. No high thickness and high thermal resistance potting material and impregnation of the windings is required which would reduce the power density capability of the electric machine.

In an additional embodiment, the specific power capability of the electric machine is further increased by reducing the volume of cooling air required. This is accomplished by providing by the stator backiron having a stator outer volume, Vs, and a stator outer surface area on the surface opposite to the magnetic air gap, SAs, while the condenser has outer volume, Vc, and a condenser outer surface area, SAc, wherein both SAc>SAs and Vs>Vc. Cooling airflow volume is reduced by the condenser having a higher surface area yet also having a smaller volume than the stator.

The electric machines in accordance with the invention preferably utilize a very high pole count, such as up to 50 or more. This increases specific power capability by several means. The stator backiron thickness can be dramatically reduced because its circumferential magnetic flux carrying requirements are reduced, which reduces the weight of the electric machine. The reduced thickness, also results in reduced thermal resistance for heat energy traversing the stator backiron from the air core windings toward the fluid in the evaporator. The stator backiron can be as thin as only 0.125" as opposed to an inch or greater for conventional electric machines. There is no longer a need to have liquid cooling embedded directly inside a ferromagnetic stator, in the magnetic flux, since the liquid cooling is sufficiently close to the stator windings. In an additional embodiment, the fluid in the evaporator is located substantially outside of the circumferentially traversing magnetic flux in the stator backiron.

As mentioned previously, the whole thermal resistance of the entire heat path from the stator windings heat generation source to the heat discharge portion is of critical importance. We have found that the highest efficiency heat transfer from the air core stator windings to the stator back iron is accomplished when all windings have the lowest possible thermal resistance coupling with the stator backiron. In a further embodiment, the insulated conductor strands are compressed against the stator backiron and bonded with active length portions all lying in a single layer. As opposed to multi-layer air core armature constructions, where low thermal conductivity resin impregnation or potting is required to thermally couple the windings to each other and then to the stator backiron, all windings are directly adhered, compressed directly to the stator backiron. This provides the maximum possible heat transfer with lowest thermal resistance, for maximized sustained specific power capability.

In some cases, it may be desirable to allow orientation of the electric machine to be variable and not a fixed application. In this case the two-phase fluid can be pumped passively through capillary action instead of just gravity. In additional embodiment of the invention, the evaporator includes an internal wick that pumps the fluid by capillary action and pumps the fluid in a path that comprises multiple turns about the diameter of the stator. Not only does this configuration allow for orientation changes of the electric machine, but can also potentially enhance cooling capability at the stator backiron through multi-pass cooling flow.

A further embodiment of the invention comprises a method for operating an electric machine to higher power densities in converting between electrical and rotary mechanical energy. The method comprises journaling a rotor to rotate about an axis of rotation and fixing a stator stationary adjacent to the rotor that magnetically exerts torque upon the rotor across a magnetic airgap in response to applied electric power. The rotor comprises permanent magnets that generate magnetic flux across the magnetic airgap and through slotless stator windings that are bonded in thermal contact to a ferromagnetic stator backiron on the surface facing the magnetic airgap. The slotless stator windings comprise pre-bundled multiple individually insulated conductor strands that are electrically connected in parallel but are electrically insulated from each other along their lengths inside the magnetic airgap where bonded to the stator backiron. The method further comprises coupling the stator to a physical loop having an evaporator, a remote located condenser and connected by two fluid flow lines filled with two phase fluid comprising liquid and gas both traveling in the same direction around the physical loop. The evaporator is constructed as an annulus co-annularly with the rotor and located radially proximate to stator and in thermal conduction with heat across the bond of the air core stator windings and through the stator backiron as heat is generated from the application of electric power. Electric power is applied to the stator windings and the evaporator transfers heat from the stator to the fluid through phase change energy of the fluid. The fluid is passively circulated to the condenser where the phase change energy is released remotely by convection to ambient air wherein the condenser is located a higher elevation than the stator.

DESCRIPTION OF THE DRAWINGS

The invention and its many advantages and features will become better understood upon reading the following detailed description of the preferred embodiments in conjunction with the following drawings, wherein.

DESCRIPTION OF THE PREFERRED EMBODIMENT

Figure 1:
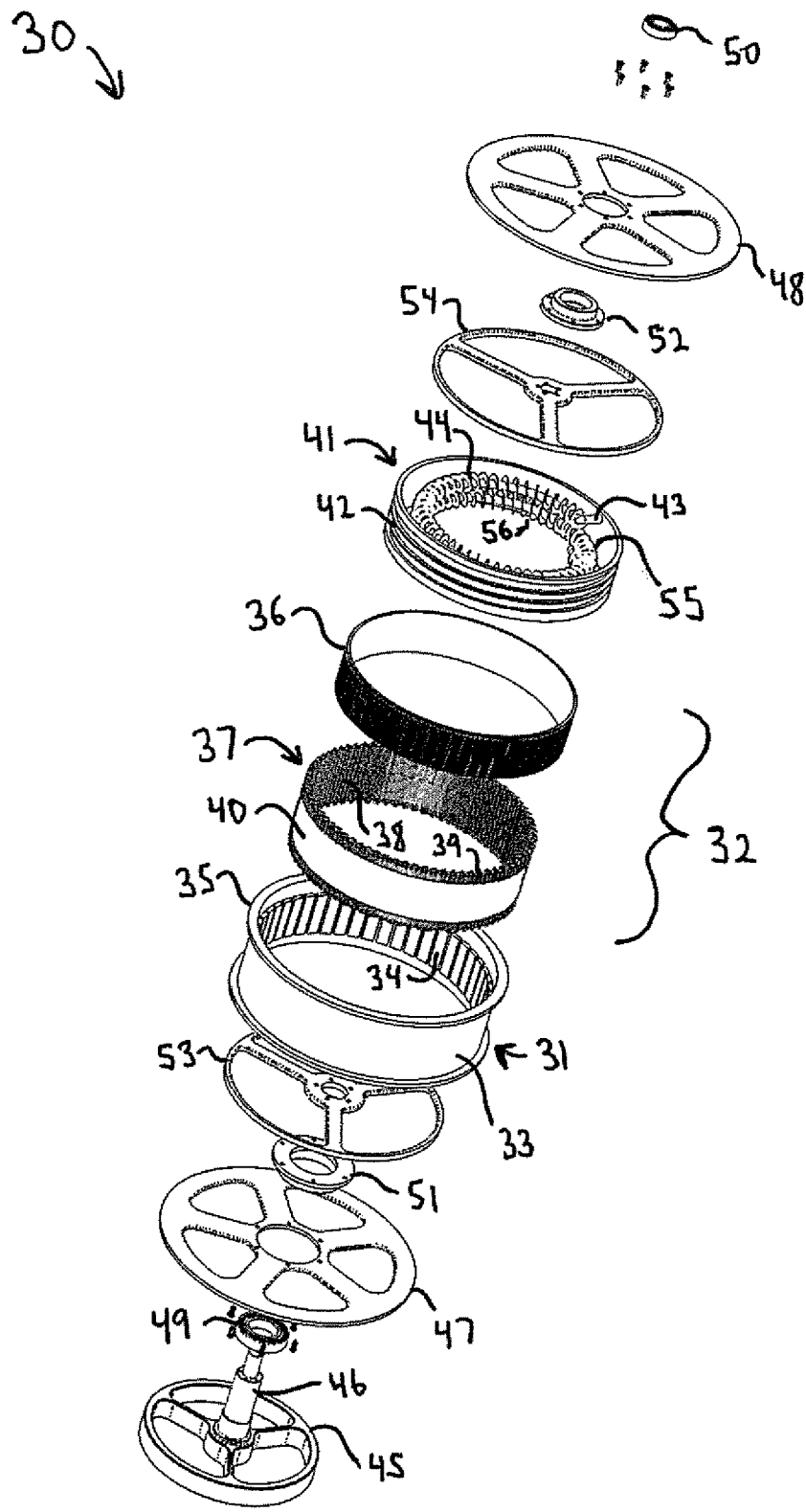
FIG. 1 is an exploded isometric view drawing of a high specific power electric machine in accordance with the invention.

Turning to the drawings, wherein like reference characters designate identical or corresponding parts, FIG. 1 shows an exploded isometric view drawing of a high specific power electric machine in accordance with the invention. The electric machine 30 may be used as a motor or a generator. As shown, the electric machine is utilized as a propulsion motor for electric aviation to drive a ducted fan or propeller. The motor 30 utilizes an outer rotor with inner stator construction and is comprised of rotor 31 and stator 32. The rotor 31 is constructed of high permeability ferromagnetic material such as steel or iron or iron-cobalt in the center back iron 33 portion. Inside the rotor 31 is an array of radially alternating permanent magnets 34, with a high pole count (50 as shown) to both limit the required thickness of the back iron 33 for conducting flux circumferentially between magnets 34 and for increasing the efficiency of the windings 37 by reducing the required length of the end turns 39. If the rotor 31 is made extremely thin, the rotor can be reinforced with an outer carbon fiber filament wound band (not shown) to carry the centrifugal loading. Alternatively, the rotor 31 could be constructed from carbon fiber composite and magnets 34 magnetized in a Halbach array configuration, however we have found this is both a lower power capability and substantially more difficult and costly construction.

Inside the rotor 31 is the stator 32. The stator is comprised of a laminated electrical steel rings 36 for conducting rotating magnetic flux circumferentially as the flux traverses back and forth across an airgap formed between the rotor 31 and stator 32. A layer of epoxy film adhesive is wrapped around the lamination stack 36 and multiple phase Litz wire windings 37 are wound onto the laminations. Preferably for highest performance, the windings 37 comprise longitudinal active regions 38 where located in the magnetic air gap and end turns 39 traversing circumferentially out side of the magnetic air gap to allow a minimized magnetic airgap. Preferably the windings 37 comprises three phases and all the the active regions 38 lie in a single layer bonded to the film adhesive. After the windings 37 are wound and stuck to the film adhesive onto the laminations 36 (preferably in a serpentine path to minimize the required number of electrical connections), the windings active region 38 is over-wrapped with a thin layer of tensioned fiberglass epoxy towpreg 40 and the stator 37 is heated to cure the towpreg 40 and film adhesive between the windings active region 38 and lamination stack 36. A high motor pole count (number of magnets 34) reduces the required thickness of the lamination stack 36, increasing the specific power while also reducing the required length of end turns 39 and resistance.

Cooling of the stator 32 is provided by liquid cooling preferably directly against the inner diameter of the low loss, ferromagnetic stator ring 36. A coolant jacket 41 is located inside the steel stator ring 36 with external channels 42 to direct coolant flow inside the stator ring. The channels 42 may be spiral pattern as shown, zig zag from bottom to top or other patterns to increase heat transfer. In a preferred construction, the cooling is provided using two phase cooling as shown. The inner diameter of the steel stator ring 36 preferably has a wick surface or a wick is added to the channels 42 where up against the stator ring 36 so as to assist the heat transfer from the stator 32 to the liquid. The cooling liquid is passively pumped through the channels 42 and then internally though a screw shape, spiral or other configuration condenser 44 inside the stator 32. A spiral can provide increased frontal area for higher heat transfer. The condenser 44 includes heat fins 56 to transfer heat energy from the liquid to the air flow through the center of the motor 30. This cooling system configuration is a loop heat pipe. One preferred coolant is ammonia. Inlet and outlet connections 43, 55 link the condenser 44 to the coolant jacket 44. A compensating chamber (not shown) is preferably included in the cooling system as the cooled liquid enters the coolant jacket 41.

In the center of the motor is a stationary shaft 46 that attaches to a nacelle of the ducted fan unit through mount 45. Other mounting methods and bearing arrangements may also be used. The rotor 31 is journalled around the shaft 46 through hubs 47, 48, with internal collars 51, 52 that hold bearings 49, 50. The hubs 47, 48 may be attached to the rotor 31 through lips 35 that also maintain the backiron 33 round. The stator 32 is held concentric with the rotor 31 so that it can freely rotate for power conversion. The stator 32 is coupled to the shaft 46 through stator hubs 53, 54 The rotating hubs 47, 48 and stationary hubs 53, 54 increase the turbulence of air flow through the center of the motor 30 and hence increase the heat transfer from the fins 44 and ultimately the armature windings 37.

Figure 2:
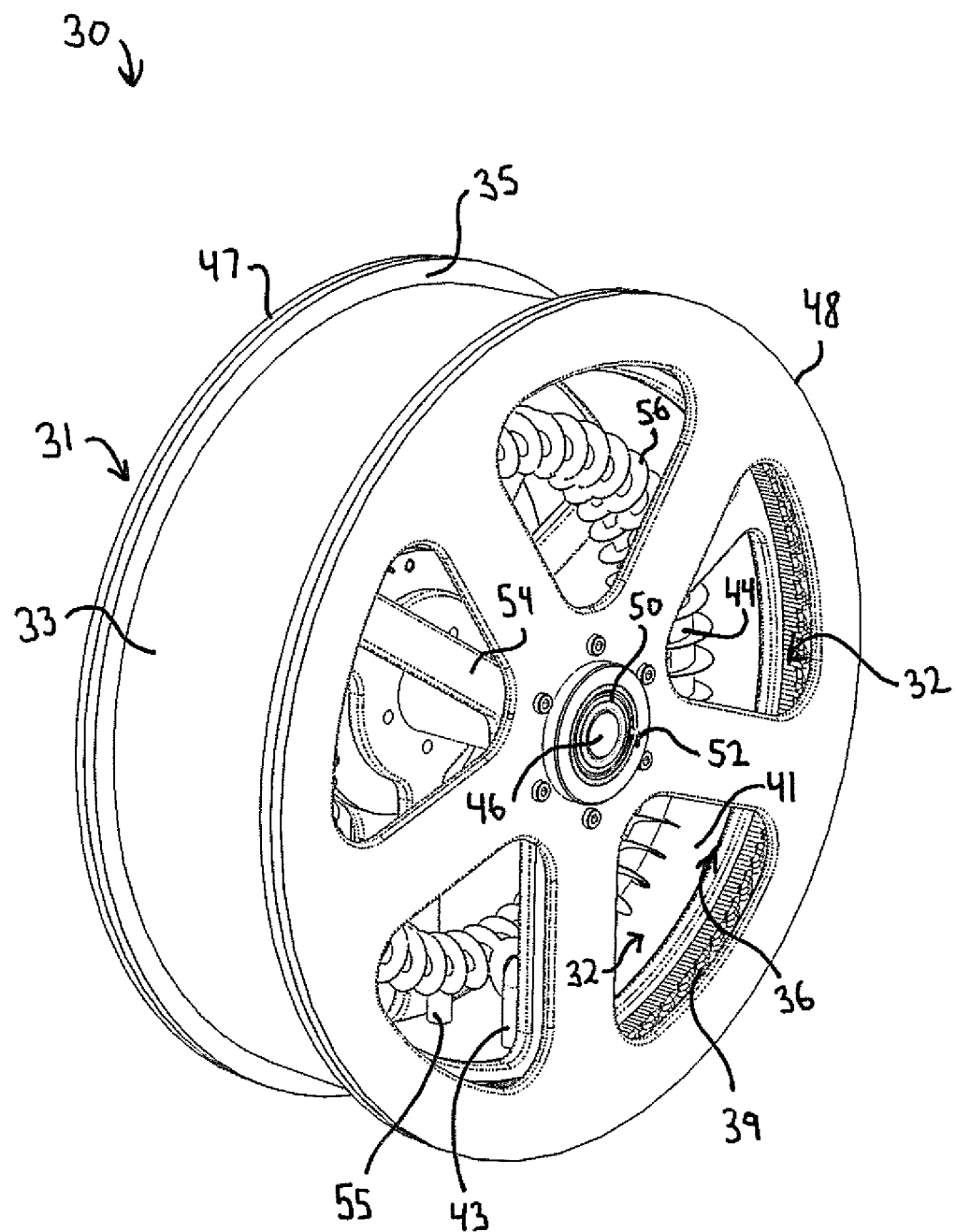
FIG. 2 is an isometric view drawing of the high specific power electric machine of FIG. 1.

An isometric view drawing of the high specific power electric machine of FIG. 1 is shown in FIG. 2. The motor 30 comprises an outer rotor 31 and internal stator 32. The rotor 31 is comprised of a back iron portion 33 for conducting magnetic flux and lips 35 for attaching hubs 47, 48. Inside the motor 30, air flows axially through and removes heat from the condenser 44 and fins 56. Inlet and outlet connections 43, 55 couple the liquid flow liquid cooling jacket 41 inside the low loss ferromagnetic stator ring 36. Winding end turns 39 extend axially beyond the stator ring 36. Hub 48 connects the rotor 31 to the shaft 46 through collar 52 and bearing 50. Stator hub 54 connects the stator 32 to be centered and stationary with the center shaft 46. The turbo fan that provides propulsion (not shown) may have its shaft end bolt to the center of hub 48, Alternatively, for higher integration, the ducted fan may be attached directly around the outside of the rotor 31.

Figure 3:
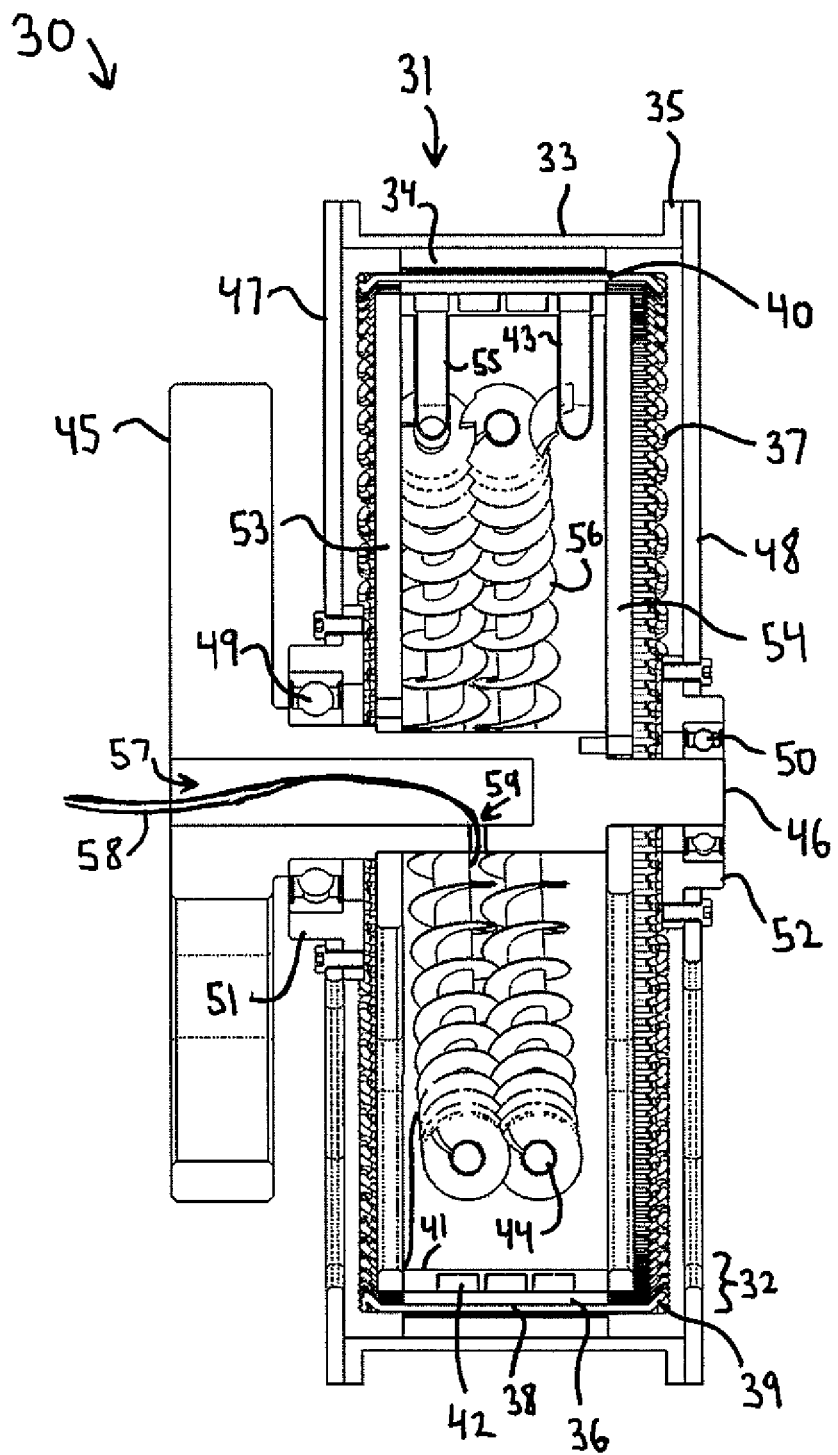
FIG. 3 is a side view drawing of the high specific power electric machine of FIG. 1.

A side view drawing of the high specific power electric machine of FIG. 1 is shown in FIG. 3. The motor 30 is comprised of rotor 31 and stator 32. The rotor 31 has a back iron portion 33 outside of permanent magnets 34 that conducts magnetic flux circumferentially between adjacent magnets. The rotor may also comprise lips 35 that maintain the rotor round and allow attachment of hubs 47, 48. The magnets 34 drive magnetic flux back and forth radially across an armature airgap formed with laminated electrical steel stator ring 36. In the airgap and attached to stator ring 36 is air core windings 37 wound from Litz wire. Preferably, the windings 37 are wound with active lengths 38 that traverse axially and convert energy inside the magnetic airgap. Preferably, end turns 39 that traverse circumferentially are located at the ends and outside of the airgap. The active length portion 38 of multiple phases is preferably located in a single radial layer against the stator ring 36 for maximum power density, efficiency and heat transfer. Other constructions such as multiple layers and helical winding in the magnetic airgap could also be done, but with typically much lower performance per amount of magnet material. In a preferred construction the Litz wire windings 37 utilize multi layer insulation which includes enamel on the base magnet wire, a top coat of thermoplastic bondable coating followed by a dielectric tape wrap such as two layers of Kapton. The bondable coating allows the windings, particularly the end turns to be heated and bonded together. The outer tape insulation bonds directly to film adhesive layer on the stator ring 36. The benefit of this construction is very high dielectric breakdown strength for long reliable operating life even in high temperatures, and very high thermal heat conductance from the windings active region 38 to the stator ring 36. No potting is required, heat transfer and efficiency are maximized and the manufacturing of the stator 32 can readily be automated. Mechanical features or clamps may be added to secure the end turns 39 yet even further if required. After wound and all windings 37 adhered to the film adhesive on the stator ring 36, a fiberglass tow preg is preferably wound in a thin layer 40 on top which compresses the Litz wire further increasing the winding density and securing the windings 37 to the stator ring 36. Inside the stator ring 36 is a liquid cooling jacket 41 with a pattern of external channels 42 to direct coolant flow and heat transfer from the stator ring 36. Coolant enters and exits the coolant jacket 41 through connections 43, 55 that couple to the heat sink or condenser 44 with heat fins 56. The motor 30 is coupled to a stationary mount 45 such as the drive nacelle, not shown, which may have a stationary center shaft 46. The rotor 31 is journalled around the shaft 46 through bearings 49, 50 that connect with collars 51, 52 and rotor hubs 47, 48. Power wires 58 to the windings 37 may be supplied though a hollow portion 57 of the center shaft 46 and side wire hole 59. Other bearing and shaft arrangements may also be used. Hub 48 and collar 52 may be used to connect to and drive the ducted fan, not shown.

Figure 4:
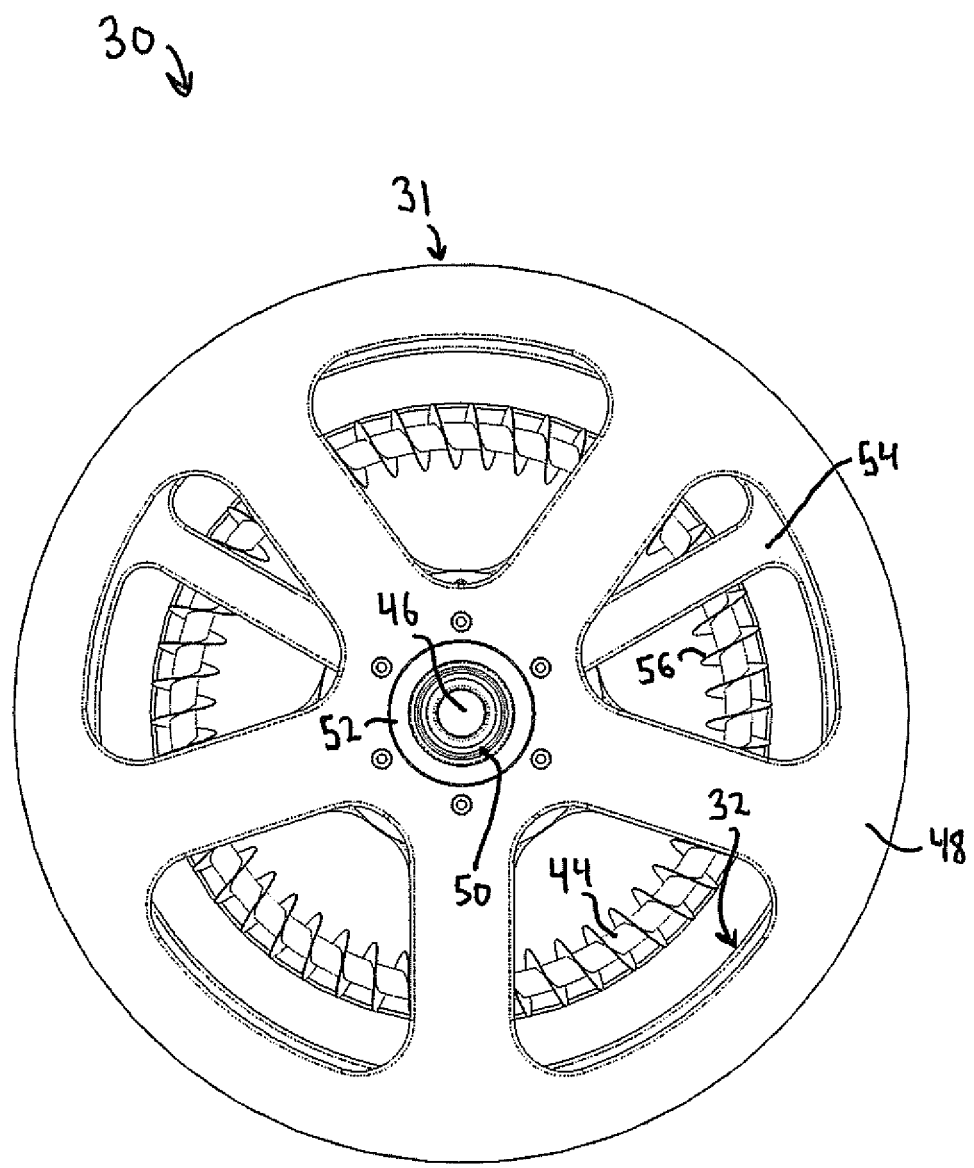
FIG. 4 is an end view drawing of the high specific power electric machine of FIG. 1.

An end view drawing of the high specific power electric machine of FIG. 1 is shown in FIG. 4. The motor 30 comprises rotor 31 and stator 32. The rotor 31 is journalled around shaft 46 through hub 48, collar 52 and bearing 50. In operation, air flows through the center of the motor providing cooling. Condenser radiator 44 circles the shaft 46 and transfers heat energy from the internal coolant to the air flow through concentric fins 56. Air flow through the center of the motor has increased turbulence from the rotating hub 48 and stator hub 54, which may increase the heat transfer from the fins 56.

I also contemplate a machine in which the positions of the rotor and stator are reversed. For example, the rotor 31 in the current embodiment is radially outside the stator 32, which is stationary. I also contemplate a machine in which the stator 32 surrounds the rotor 31, which rotates inside the stator 32. The choice of the two configurations would depend on the requirements of the application, but benefits of the first (disclosed) embodiment would also apply to the second embodiment.

Figure 5:
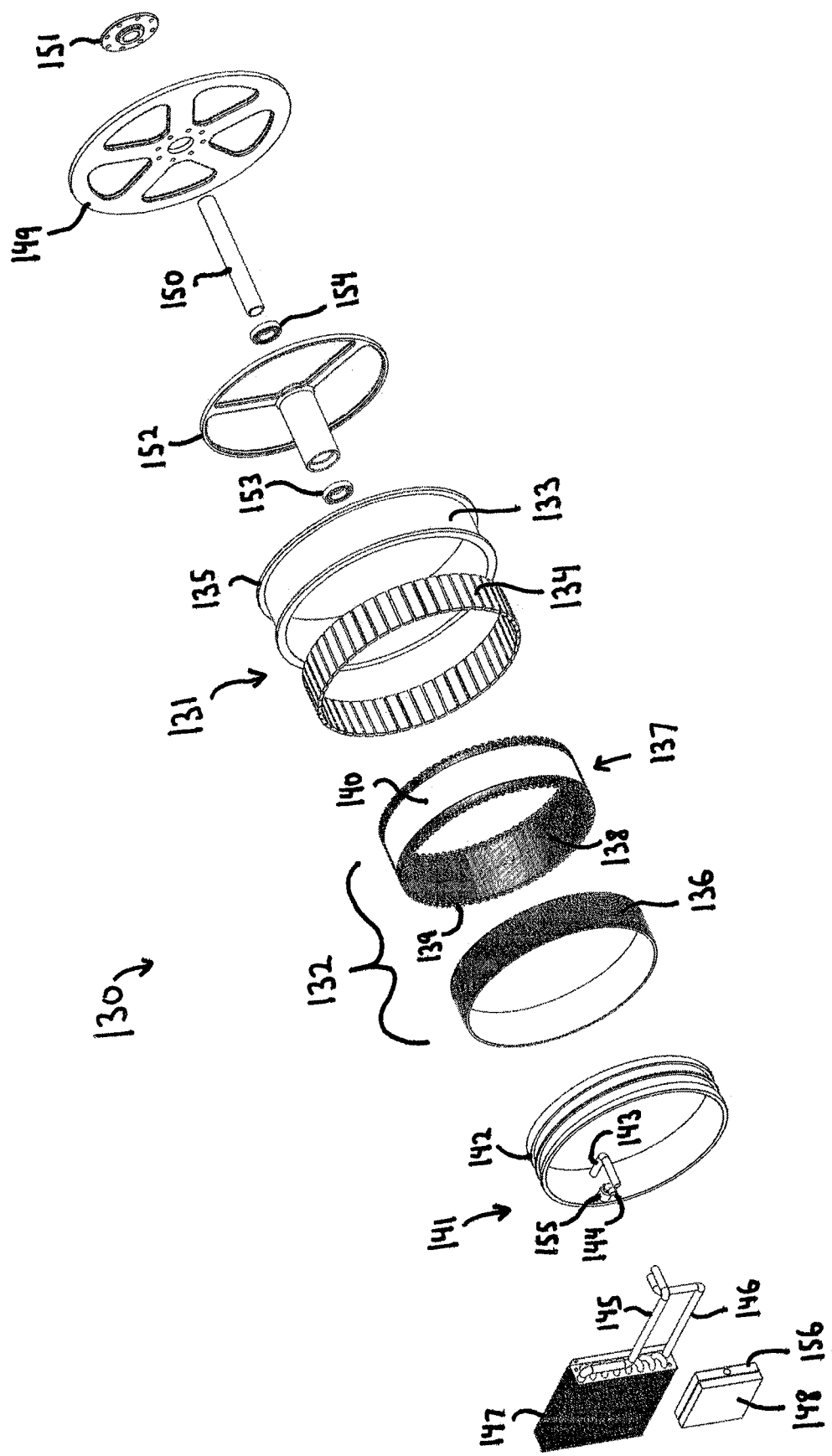
FIG. 5 is an exploded isometric view drawing of an alternate configuration high specific power electric machine in accordance with the invention.
Figure 6:
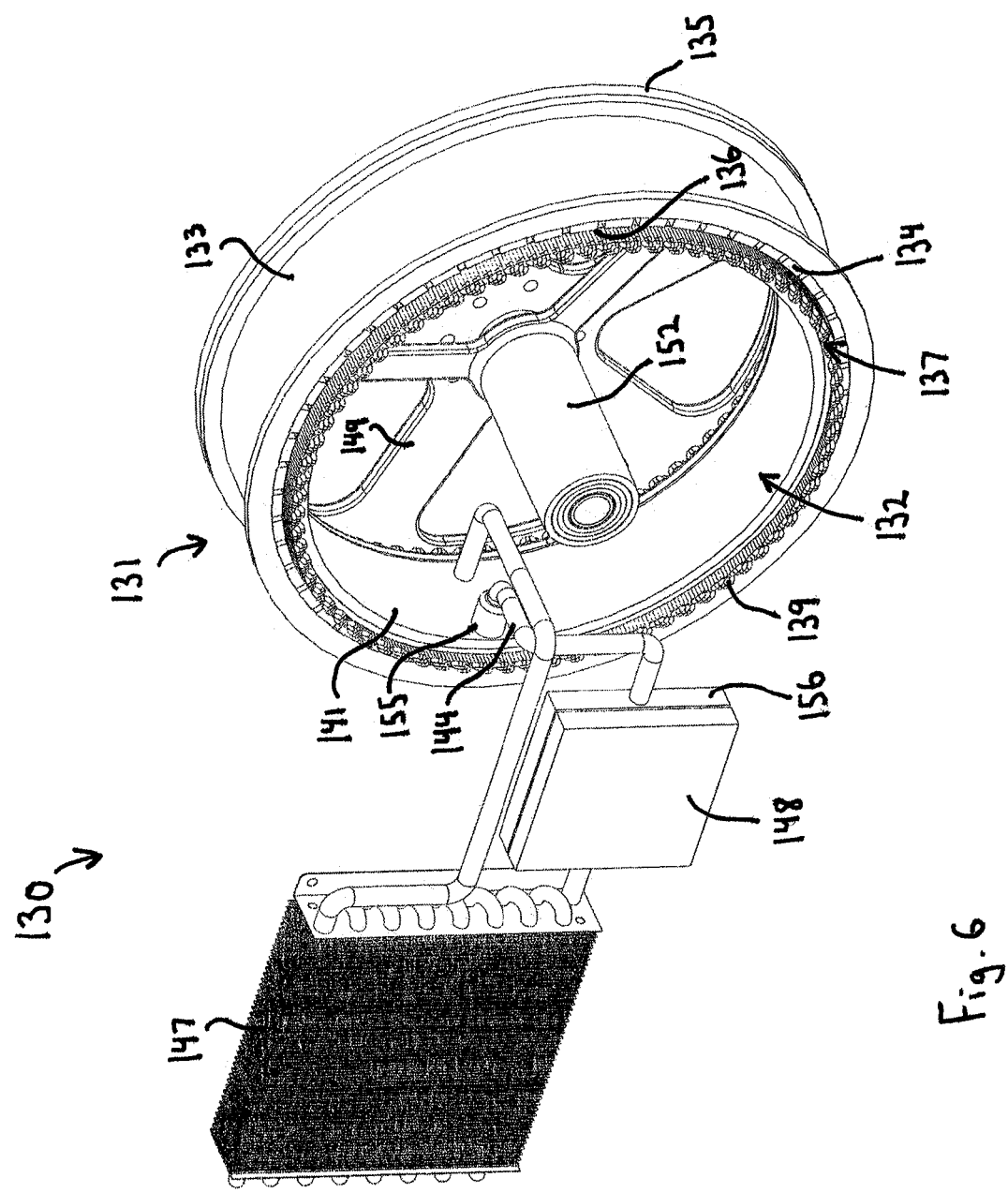
FIG. 6 is an isometric view drawing of the high specific power electric machine of FIG. 5.

FIG. 5 shows an exploded isometric view drawing of a high specific power electric machine in accordance with the invention. The electric machine 130 may be used as a motor or a generator. As shown, the electric machine is utilized as a propulsion motor for electric aviation to drive a ducted fan or propeller. The motor 130 utilizes an outer rotor with inner stator construction and is comprised of rotor 131 and stator 132. The rotor 131 is constructed of high permeability ferromagnetic material such as steel or iron or iron-cobalt in the center back iron 133 portion. Inside the rotor 131 is an array of radially alternating permanent magnets 134, with a high pole count (50 as shown) to both limit the required thickness of the back iron 133 for conducting flux circumferentially between magnets 134 and for increasing the efficiency of the windings 137 by reducing the required length of the end turns 139. If the rotor 131 is made extremely thin, the rotor can be reinforced with an outer carbon fiber filament wound band (not shown) to carry the centrifugal loading.

Inside the rotor 131 is the stator 132. The stator is comprised of a laminated electrical steel rings 136, preferably non-oriented silicon steel, for conducting rotating magnetic flux circumferentially as the flux traverses back and forth across an airgap formed between the rotor 131 and stator 132. A layer of epoxy film adhesive is wrapped around the lamination stack 136 and multiple phase Litz wire windings 137 are wound onto the laminations. Preferably for highest performance, the windings 137 comprise longitudinal active regions where located in the magnetic air gap and end turns 139 traversing circumferentially out side of the magnetic air gap to allow a minimized magnetic airgap. Alternate winding configurations such as helical winding, multiple layer individual coils and other could also be utilized although with reduced performance per amount of magnet. Preferably the windings 137 comprises three phases and all the the active regions traversing longitudinally lie in a single layer bonded to the film adhesive. After the windings 137 are wound and stuck to the film adhesive onto the laminations 136 (preferably in a serpentine path to minimize the required number of electrical connections), the windings active region, which provides torque and power conversion, is overwrapped with a thin layer of tensioned fiberglass epoxy towpreg 140 and the stator 137 is heated to cure the towpreg 140 and film adhesive between the windings active region and lamination stack 136. A high motor pole count (number of magnets 134) reduces the required thickness of the lamination stack 136, increasing the specific power while also reducing the required length of end turns 139 and resistance.

Cooling of the stator 132 is provided by liquid cooling preferably directly against the inner diameter of the low loss, ferromagnetic stator ring 136. A coolant jacket 141 is located inside the steel stator ring 136 with external channels 142 to direct coolant flow inside the stator ring. The channels 142 may be spiral pattern as shown, zig zag from bottom to top or other patterns to increase heat transfer. In a preferred construction, the cooling is provided using two phase cooling as shown. The inner diameter of the steel stator ring 136 preferably has a wick surface or a wick is added to the channels 142 where up against the stator ring 136 so as to assist the heat transfer from the stator 132 to the liquid. The cooling liquid is passively pumped through the channels 142 and then internally though a condenser 147 outside and removed from the motor 130. This cooling system configuration is a loop heat pipe. One preferred coolant is ammonia. Inlet and outlet connections 144, 143 link the condenser 147 to the coolant jacket 141 through loop lines 145, 146. A compensating chamber 144 is preferably included in the cooling system as the cooled liquid enters the coolant jacket 141, although could also be located at other locations. Included on the loop line 146 is a cold plate 156 to which the electronic motor drive 148 is attached to provide cooling for the electronics that drive the motor 130. The rotor 131 is mounted to carbon fiber composite hub 149 that utilizes hub 151 to attach to center shaft 150, supporting the rotor as a cantilever from a single side. This construction uniquely allows for the heat energy from the stator, via the loop heat pipe, efficiently to exit the motor and have a high performance heat dissipation via the condenser 147, located away from the motor 32 and wherever optimal placement for the electric aircraft or other application. Stator hub 152 attaches the cooling jacket 141 that supports the stator 132. Bearings 153, 154 journal the stator hub 152 around the shaft 150.

Figure 7:
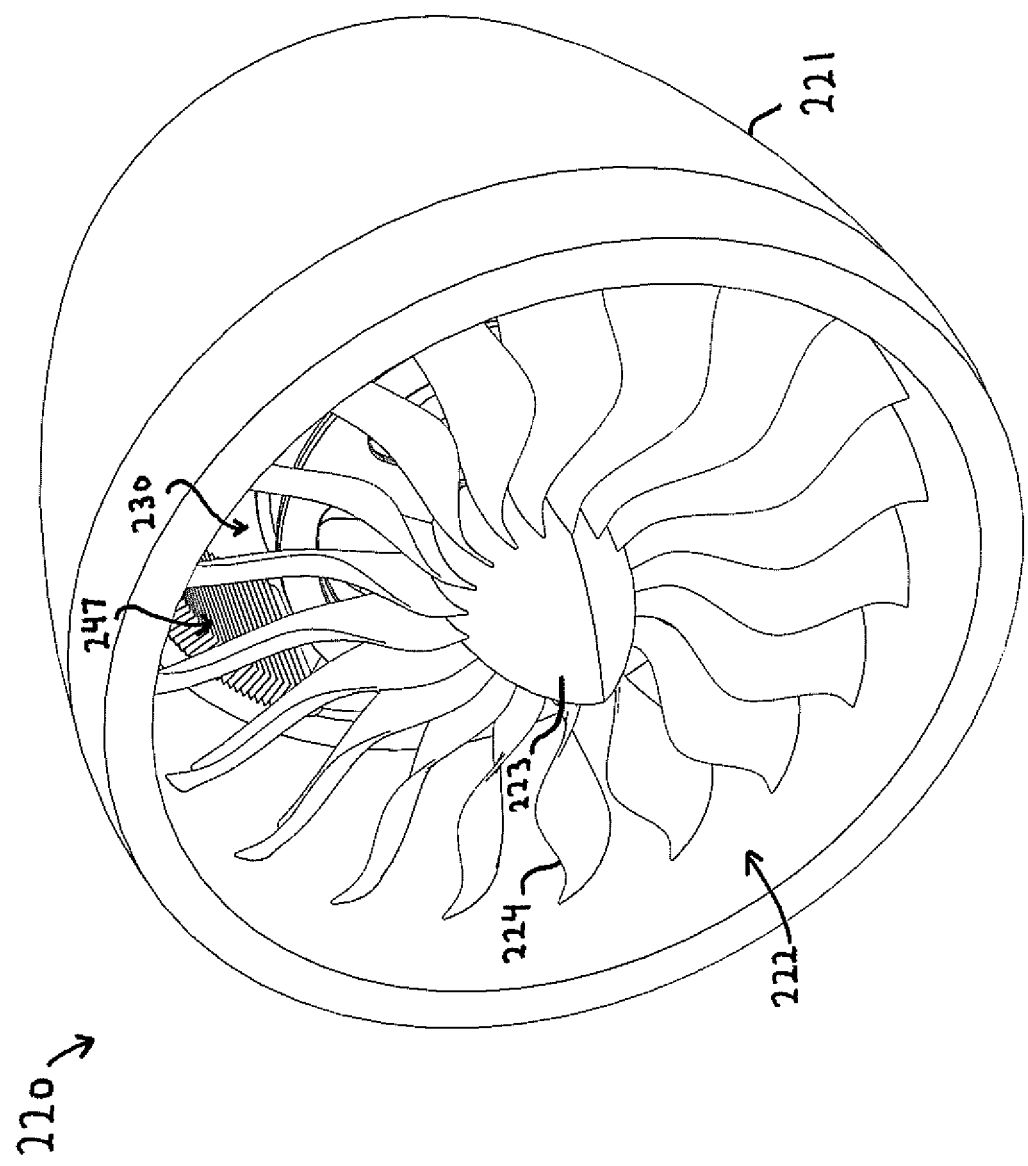
FIG. 7 is an isometric view drawing an electric ducted fan with the high specific power electric machine for use in electric aviation in accordance with the invention.

An isometric view drawing an electric ducted fan with the high specific power electric machine for use in electric aviation in accordance with the invention is shown in FIG. 7. The electric ducted fan 220 comprises an outer nacelle duct 221 and internal fan rotor 222 that is driven by electric motor 230. The fan rotor 222 is comprised of a center inlet cone 223 and outer fan blades 224. Heat energy from the motor 230 (comprising winding resistive and eddy current and stator backiron eddy current and hysteresis losses) is conducted out and to a higher elevation above by two phase cooling comprised of a thermosyphon. The condenser radiator 247 of thermosyphon is both located above the motor 230 and in the air stream of the fan blades224, preferably inside the duct 221 to provide for high efficiency cooling even at maximum power and low ground speed such as during aircraft takeoff. As shown the electric ducted fan 220 is designed for horizontal shafts and thrust, however it could also be used in vertical takeoff aviation with a vertical shaft and thrust. In this configuration, the condenser would also be located above the motor for effective thermosyphon operation, whereby heat travels out and up from the motor stator before condensing the fluid. The thermosyphon allows the heat from the motor, even with an internal stator, to be passively conducted by two phase fluid to a location for optimal air cooling, something that practically could not be accomplished by thermal conduction.

Figure 8:
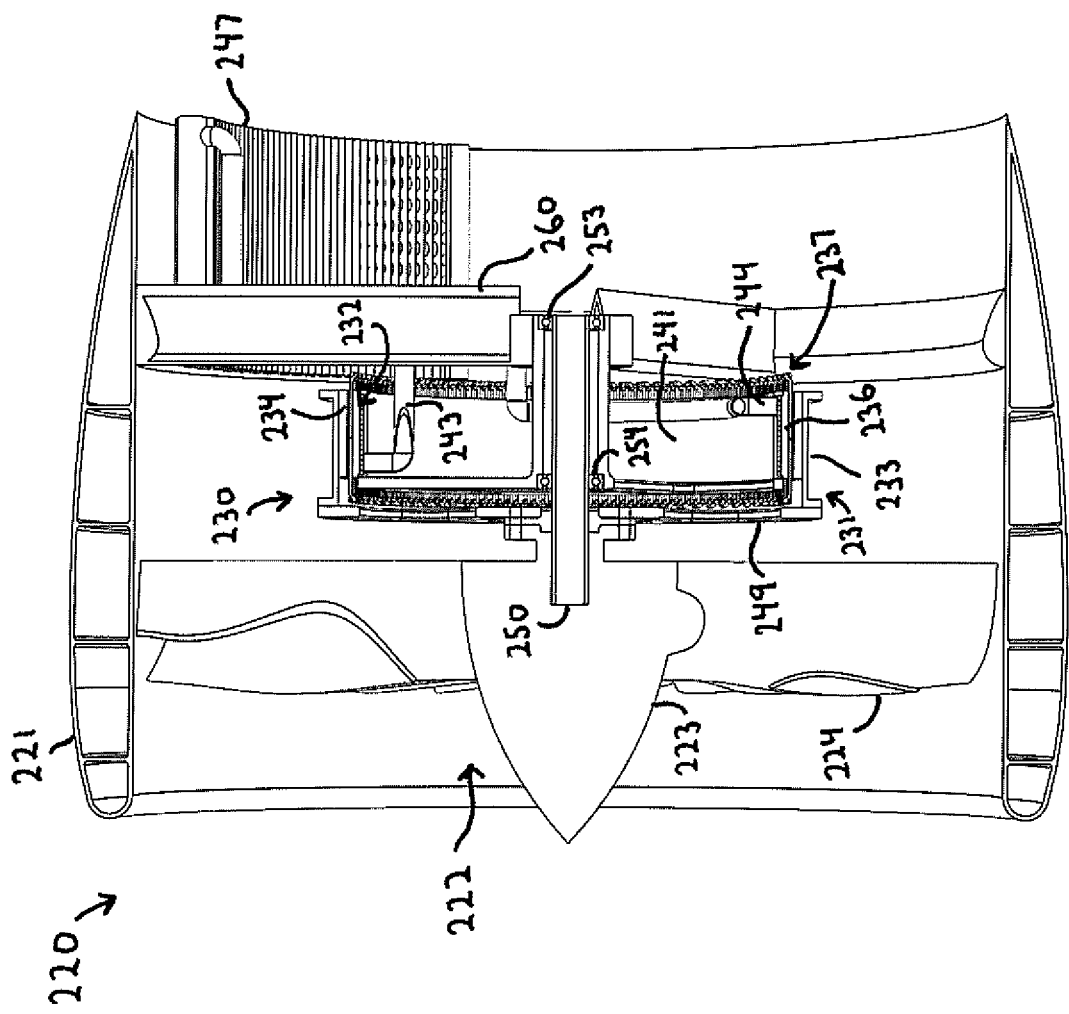
FIG. 8 is an side view drawing of the electric ducted fan with high specific power electric machine of FIG. 7.

A side view drawing of the electric ducted fan with high specific power electric machine of FIG. 7 is shown in FIG. 8. The electric ducted fan unit 220 comprises duct 221 and a fan rotor 222 with inlet cone 223 and fan blades 224. The electric motor 230 drives the fan rotor 222 through center shaft 250 journaled by bearings 253, 254. The bearings 253, 254 connected to the nacelle duct 221 through support spokes 260. The motor 230 comprises a rotor 231 and a stator 232. The rotor 231 connects to the rotor shaft 250 through rotor hub 249 located at one end. The stator 232 comprises a stator backiron 236 constructed of an assembly of Sendust compressed alloy powder arc segments for low magnetic induced losses. Litz wire windings 237 are wound directly onto a film adhesive applied to the outer surface of the stator backiron 236 prior to winding. Inside the stator backiron used for circumferentially conducting the magnetic flux from rotor magnets 234 is a fluid cooling jacket 241. The cooling jacket 241 has parallel internal paths from bottom inlet 244 to top outlet traveling in direct contact up both diametral sides of the stator backiron 236. The outlet 243 travels upward above the motor 230 to a condenser 247 located in direct airflow from the fan rotor 222. After fluid cooling and phase changing back to liquid, the flow continues back to the inlet 244 of the cooling jacket 244.

Figure 9:
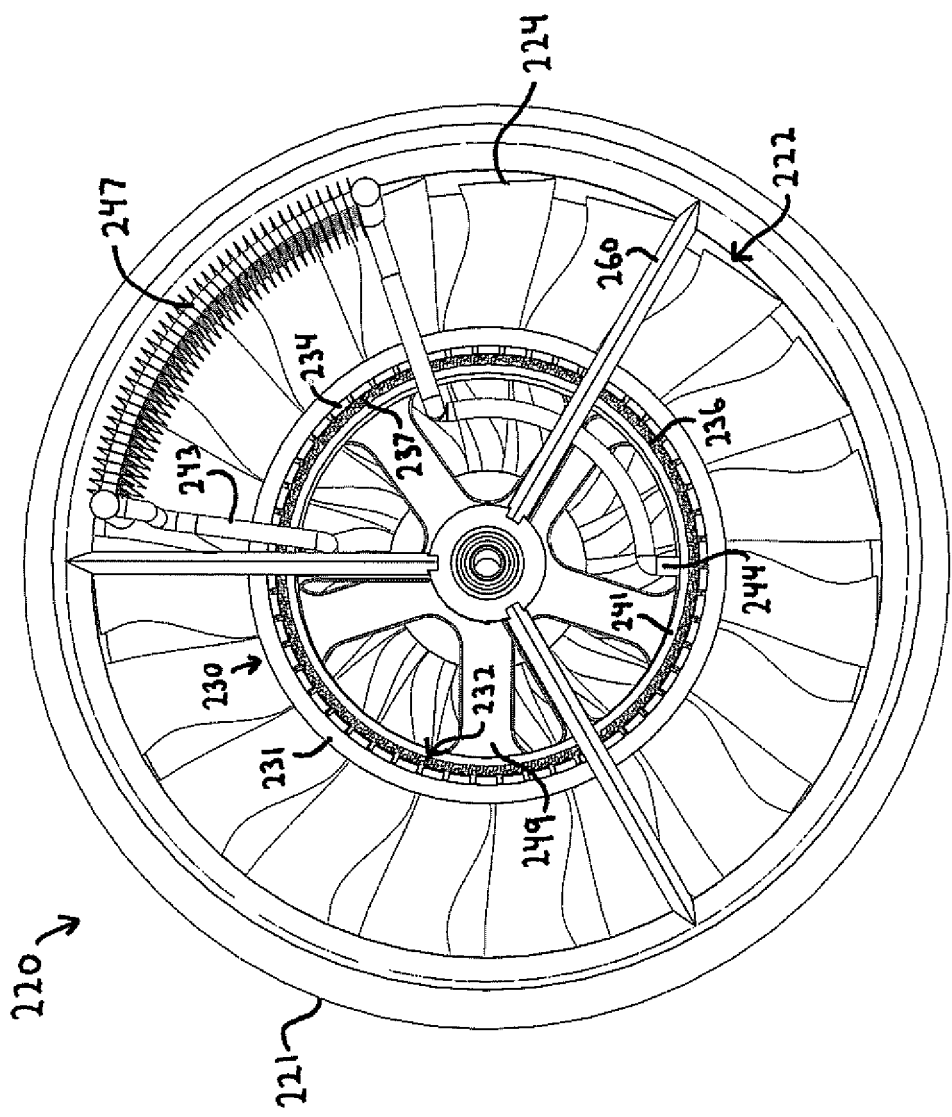
FIG. 9 is a rear view drawing of the electric ducted fan with high specific power electric machine of FIG. 7.

A rear view drawing of the electric ducted fan with high specific power electric machine of FIG. 7 is shown in FIG. 9. The electric ducted fan 220 has an outer nacelle 221 and inner fan rotor 222 with bladed 224 that are driven by motor 230 through hub 249. The motor 230 is comprised of an outer rotor 231 and inner stator 232 although version could also be constructed with positions reversed without some of the benefits of the invention. The rotor 231 has internal magnets 234 that drive magnetic flux back and forth across a radial airgap to the stator 232. The stator 232 is comprised of powdered ferromagnetic material, Sendust, formed by assembling multiple pressed arc pieces for form the stator backiron 236. Alternatively, thin lamination arc segments of non-oriented silicon steel could be utilized but with reduced thermal conductivity. Litz wire windings 237 are wound by adhering to a film adhesive pre-applied to the surface of the stator backiron 237. Inside the stator backiron 236 is a cooling jacket 241 that directs flow of ammonia coolant directly up both sides of the inner diameter of the stator backiron to absorb heat generated from the windings 236 and stator backiron 236 in operation. The ammonia or other suitable two phase coolant enters the cooling jacket 241 at the bottom inlet 244, flows upward as heated and exits at the top at the top outlet 243. The top outlet 243 connects to the condenser 247 located above the motor 230 which transfers the heat energy to the ducted airflow from the fan 224. The cooled fluid completes the loop traveling from the condenser 247 back to the bottom inlet 244 of the cooling jacket 241.

Figure 10:
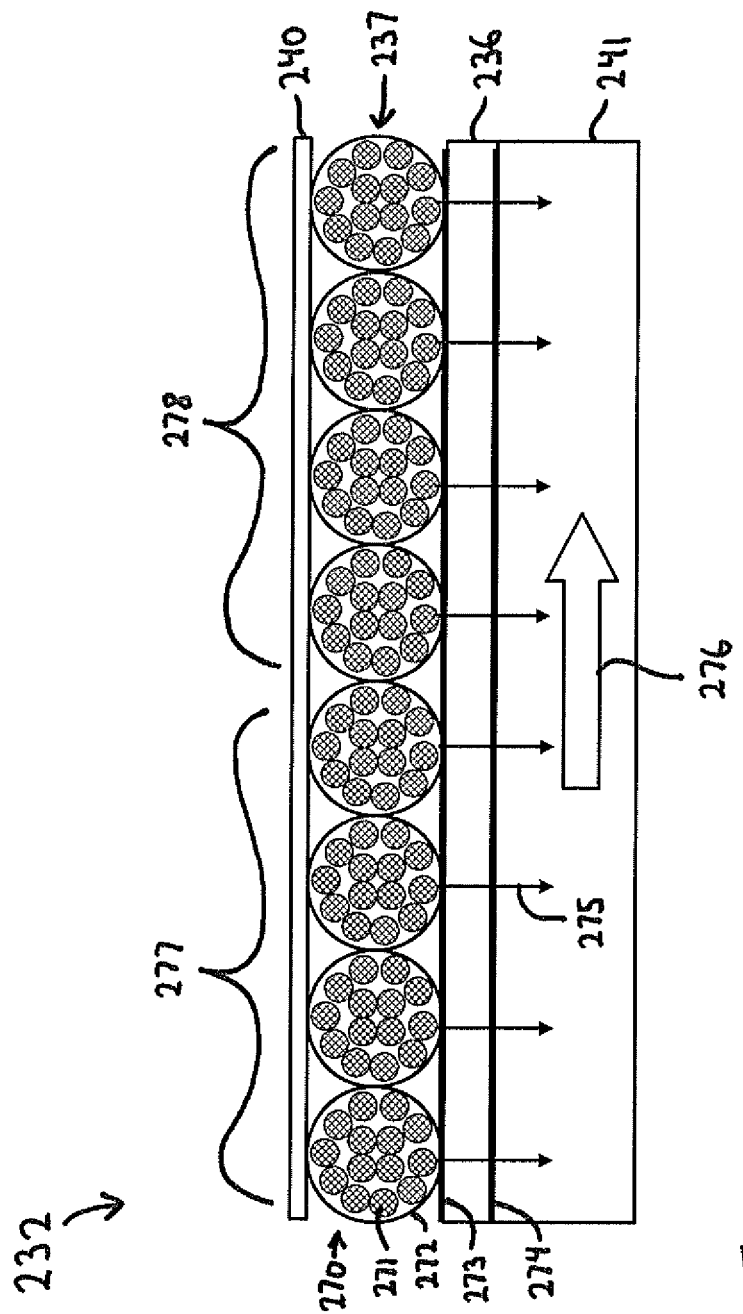
FIG. 10 is a schematic up close drawing of a section of the stator of the high specific power electric machine in FIG. 7.

A schematic up close drawing of a section of the stator of the high specific power electric machine in FIG. 7 is shown in FIG. 10. The stator 232 is is comprised of stator backiron 236 and windings 237. The windings 237 are wound with Litz wire 270 consisting of individually enamel-insulated strands 271 that are bundled together inside a Kapton tape wrapped serve 272. The wire 270 is adhered to the stator backiron 236 by adhering directly to film adhesive 273. The film adhesive tacky is preferably tacky so that the windings 237 can be adhered and hold the winding operational pattern for torque production in the winding process. Adjacent the stator backiron 236 is a cooling jacket 241 that is attached at axial ends by sealant adhesive 274. Inside the cooling jacket 241 is a cooling liquid flow 276 that absorbs the heat energy 275 from the windings 237 and lesser amount of magnetic induced loss heat energy from the stator backiron 236. The coolant flow 276 is preferably passive and changes phase from liquid to gas as the heat energy 275 is absorbed and transmitted remotely to a condenser where discharged and phase-changed back to liquid. Multiple phases 277, 278 of the windings 237 are adhered by film adhesive 273 to lie preferably is a single active lengths portion layer against the stator backiron 236. After winding the windings 237 by winding into the winding pattern, a thin outer tensioned wrap of fiberglass epoxy tow preg 240 is overwrapped to compress the windings 237 and contain them against the stator backiron 236. because of the overwrap band 240, the film adhesive may be either a thermoset adhesive that achieves a high inherent bond strength or may alternately be a non-cross-linking pressure sensitive adhesive with thermally conductive additives, such as thermal double sided tape used for mounting electronics to heat sinks. The stator construction uniquely provides high dielectric breakdown strength with low thermal resistance for heat removal and high speed automatable production compatibility. The dielectric breakdown strength between phases 277, 278 consists of the enamel insulation on the strands 271, two layers of Kapton tape for 50% lap wrapping per wire, multiplied by two since applied to both of the adjacent wires 270. The dielectric strength between windings 237 and ground which is the stator backiron 236 consists of the enamel insulation on the strands 271, two layers of Kapton tape for 50% lap wrapping per wire and the layer of film adhesive 273.

Figure 11:
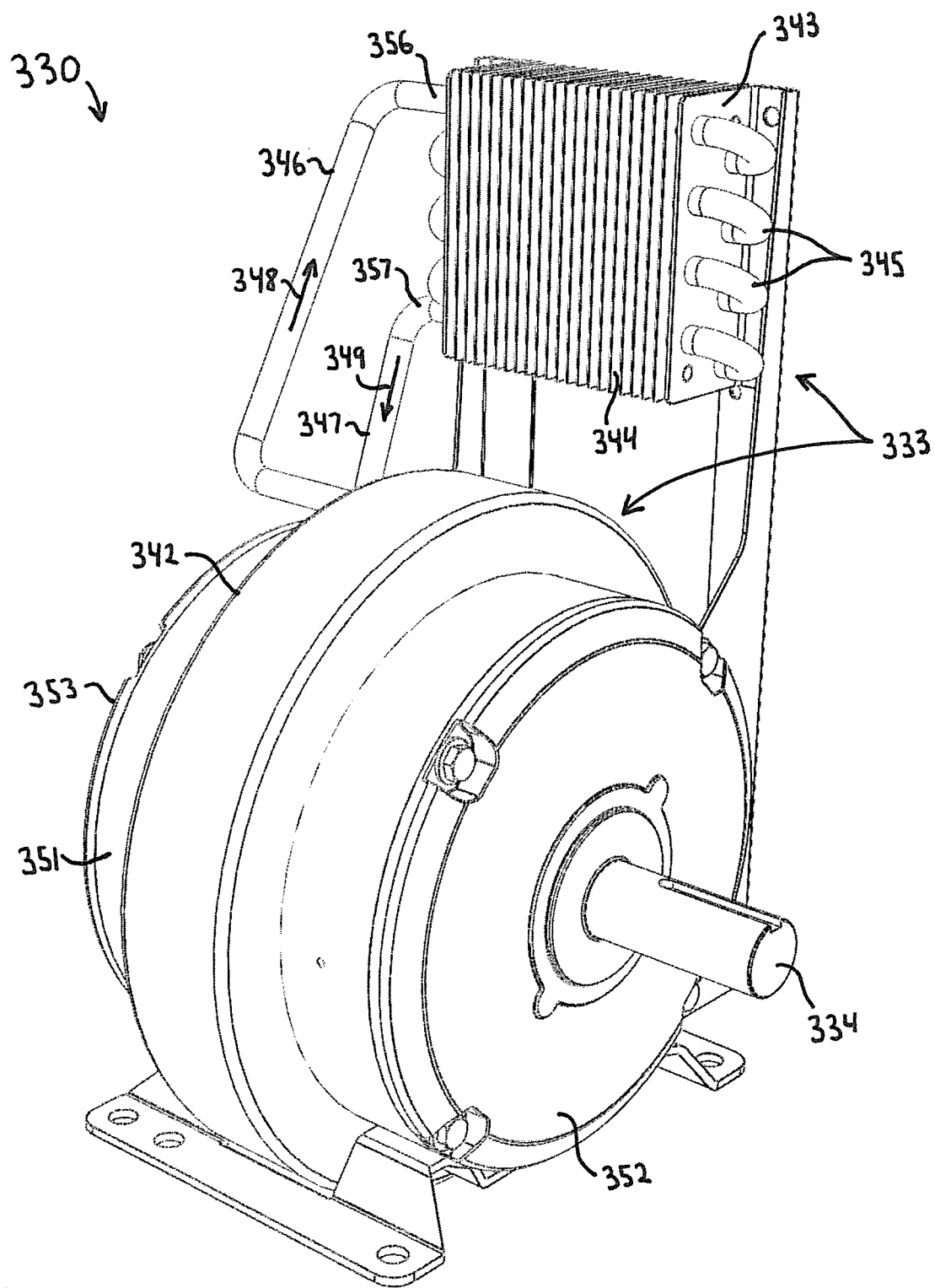
FIG. 11 is an isometric view drawing of a second alternate configuration high specific power electric machine in accordance with the invention.

An isometric view drawing of a second alternate configuration high specific power electric machine in accordance with the invention is shown in FIG. 11. The electric machine 330 shown is utilized as a motor. The motor 330 drives output shaft 334 and provides remote heat discharge 333 from internal stator resistance heat energy generator during operation. Evaporator 342 conducts heat energy to remote located condenser 343 through internal two-phase fluid. The evaporator 343 comprises a high density of heat transfer fins 344 for transferring heat energy to surrounding air and fluid lines 345 spread the heat to the fins 344. Fluid line 347 transfers predominantly cooled liquid ammonia 349 back to the evaporator 342 which fluid line 346 transfer heated gaseous ammonia 348 to from the evaporator 342 to the condenser 343. Fluid line 346 connects to the condenser 343 and condenser entrance connection 356 and fluid line 347 connects to the condenser 343 at condenser exit connection 357. The evaporator 342 surrounds the outer housing 351 which is coupled with housing endplates 352, 353.

Figure 12:
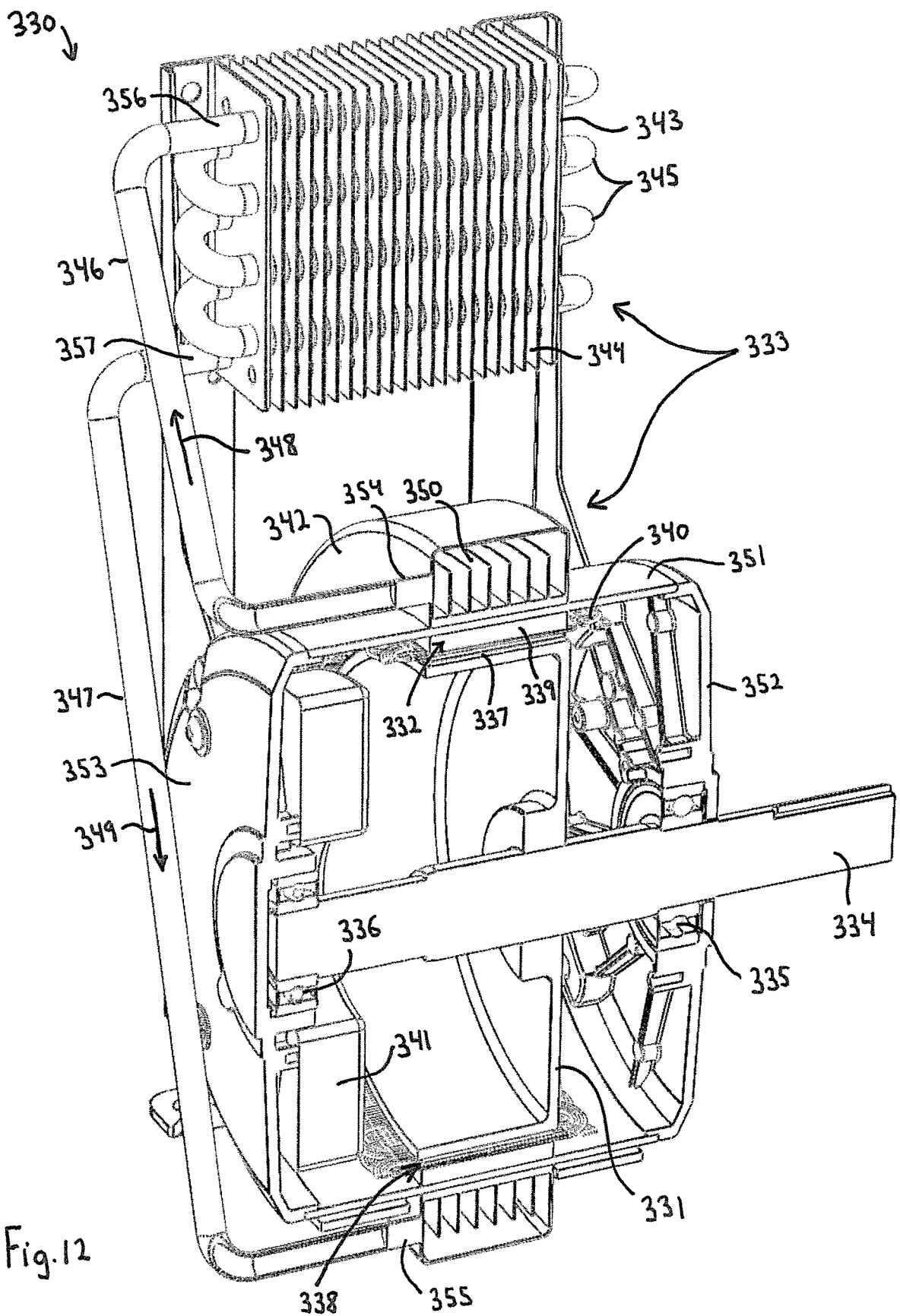
FIG. 12 is an exploded isometric view drawing of the high specific power electric machine of FIG. 11.
Figure 13:
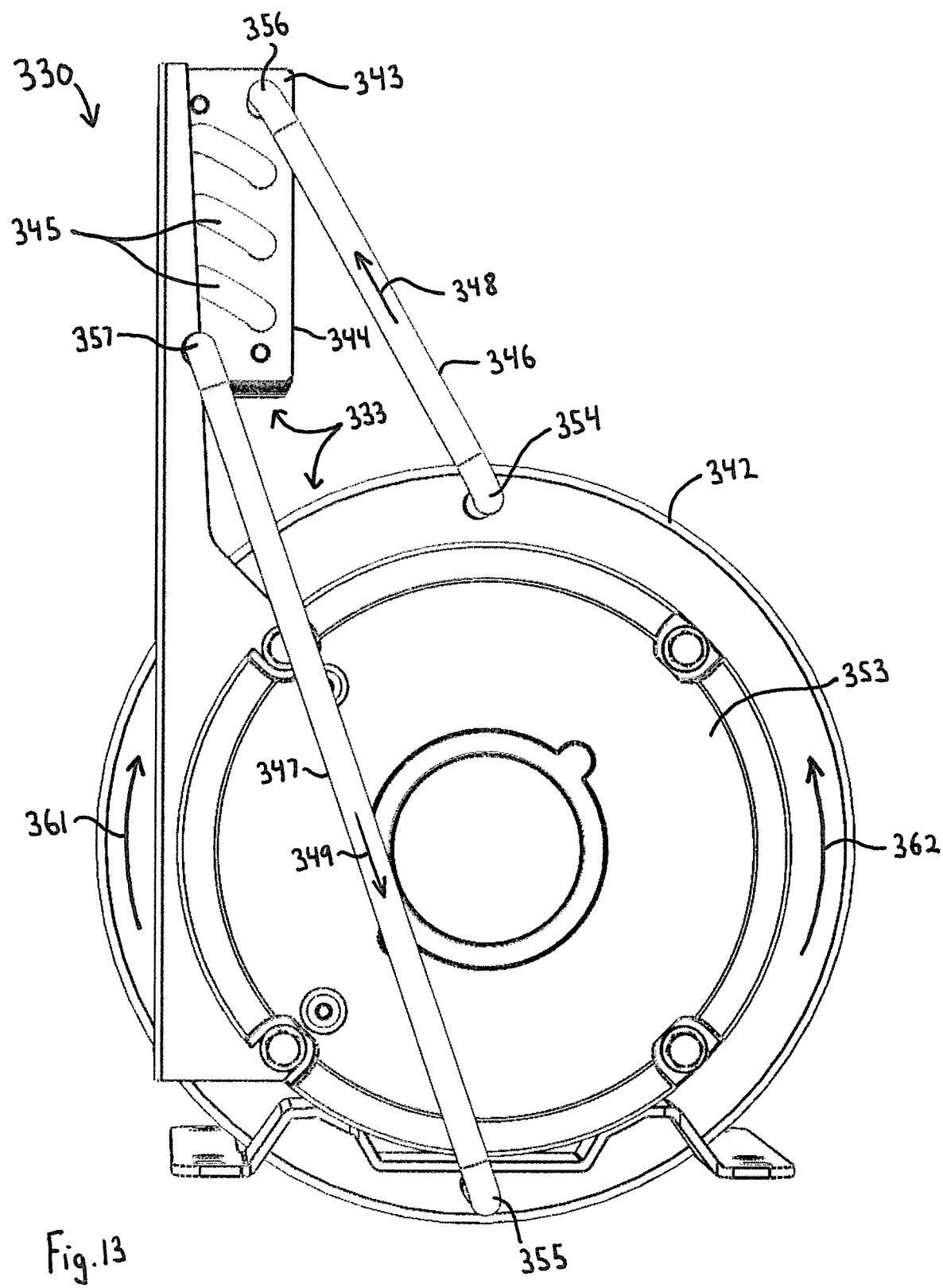
FIG. 13 is an end view drawing of the high specific power electric machine of FIG. 11.

More details of the complete motor 330 showing and explaining all the elements of the invention are provided through an exploded view. An exploded isometric view drawing of the high specific power electric machine of FIG. 11 is shown in FIG. 12. The motor 330 comprises a rotor 331 and a stator 332 and remote heat discharge 333. The rotor 331 drives the output shaft 334 which is journaled for rotation by bearings 335, 336. Attached to the other diameter of the rotor 331 is a circumferential array of alternating polarity permanent magnets 337 that drive magnetic flux back and forth across the air core armature airgap 338. The stator 332 is comprised of a magnetic loss mitigating powdered iron (such as Sendust) stator backiron 339. The stator backiron can be constructed to be radially thing, for by weight reduction increasing specific power and reducing radial thermal resistance by utilizing a high magnetic pole count of magnets 337. Bonded to the inner diameter of the slotless stator backiron 332 are multiple phase Litz air core wire windings 340. The windings 340 generate heat during operation of the motor 330 from resistive heating which is conducted directly through the bond layer and radially through the stator backiron 339. A synchronous motor drive inverter 341 provides the synchronous power to drive the windings 340. The heat generation from the windings 340 conducted radially through the stator backiron 339 is removed by two phase fluid-filled evaporator 342 in thermal contact surrounding the stator backiron 339. The evaporator 342 conducts the heat energy to the remotely located condenser 343 using internal ammonia in two phase state. Due to the two-phase ammonia, the effective thermal conductivity between the evaporator 342 and the condenser 343 is as much as 250 times greater than the thermal conductivity of solid copper, further enhancing the low thermal resistance of the heat removal from the air core stator windings 340. This dramatically increases the sustainable power density capability of the motor 330 by limiting the temperature increase of the air core windings 340 and preventing thermal increases in resistance which would yet further increase heat energy generation. The condenser 343 comprises a high density of fins 344 which efficiently transfers the heat energy to ambient air. Fluid lines 345 in the condenser 343 spread the heat energy through the fins 344 as the internal fluid is cooled from gas to liquid. Fluid line 346 connects the evaporator 342 to the condenser 343 carrying ammonia partially with internal gas 348. Fluid line 347 connects the condenser 343 to the evaporator 343 at the bottom of the motor for returning ammonia in cooled liquid form 349. The evaporator 343 preferably utilizes internal fins 350 to increase the efficiency of the heat transfer from the stator backiron 339 to the internal two phase ammonia. Heat transfer from the stator backiron 339 is conducted through a thin-walled structural motor housing 351. The outer housing 351 is supported by housing endplates 352, 353. Fluid exits the evaporator 343 through higher elevation evaporator exit connection 354 and enters the evaporator 343 through lower elevation evaporator entrance connection 355. Between the evaporator entrance connection 355 and evaporator exit connection 354, the internal ammonia travels parallel paths up both diametral sides of the stator backiron 339. The ammonia fluid preferably enters the condenser 343 at a higher elevation condenser entrance connection 356 and exits the condenser 343 at a lower elevation condenser exit connection 357.

The internal fluid flow paths of the motor 330 are more completely illustrated through an end view drawing. An end view drawing of the high specific power electric machine of FIG. 11 is shown in FIG. 12. The motor 330 comprises remote heat discharge 333 that completes the low thermal resistance heat conduction from resistance heating of internal air core stator windings through evaporator 342 to the condenser 343. The condenser 343 efficiently transfers the heat to ambient air through higher density heat transfer fins 344. Fluid lines 345 spread the heat to the fins 344 as the internal ammonia phase changes from gaseous to liquid. Fluid line 346 carries heat absorbed gaseous ammonia 348 from the evaporator exit connection 354 to the condenser entrance connection 356. Fluid line 347 carries cooled liquid ammonia 349 from the condenser exit connection 357 to the evaporator entrance connection. The fluid inside the evaporator 342 travels up parallel diametral paths 361, 362 around the internal stator backiron as heat energy from the stator windings is absorbed and internal ammonia is converted from liquid to partial gaseous form.

Obviously, numerous modifications and variations of the described preferred embodiments are possible and will occur to those skilled in the art in light of this disclosure. Accordingly, I intend that these modifications and variations, and the equivalents thereof, be included within the spirit and scope of the invention as defined in the following claims, wherein we claim:

The invention claimed is:

1. An electric machine for converting between electrical and rotary mechanical energy comprising:
    a rotor that is journalled to rotate about an axis of rotation, and a stator that is stationary adjacent to said rotor and magnetically exerts torque upon said rotor across a magnetic airgap in response to applied electric power, said rotor having a surface that is opposed to, and spaced apart from, a corresponding surface on said stator, said rotor surface and said stator surface defining said magnetic airgap therebetween;
    said rotor comprising permanent magnets that generate magnetic flux across said magnetic airgap and through air core stator windings that are bonded in thermal contact to a slotless ferromagnetic stator backiron comprising said stator surface facing said magnetic airgap;
    said air core stator windings are comprised of pre-bundled multiple individually insulated conductor strands that are electrically connected in parallel but are electrically insulated from each other along their lengths inside said magnetic airgap where they are bonded to said slotless ferromagnetic stator backiron;

said air core stator windings are cooled by a physical loop having an evaporator, a remote located condenser and connected by two fluid flow lines filled with two phase fluid comprising liquid and gas both traveling in the same direction around said physical loop;

said evaporator is constructed as an annulus co-annular with said rotor and located in thermal contact with said slotless ferromagnetic stator backiron and in thermal conduction indirectly with heat across said bond of said air core stator windings and through said slotless ferromagnetic stator backiron as heat is generated from said application of electric power;

said evaporator transfers heat from said slotless ferromagnetic stator backiron to said fluid through phase change energy of said fluid, and said fluid is passively circulated to said condenser where said phase change energy is released remotely by convection of heat to ambient air, wherein said condenser is located at a higher elevation than said stator and said evaporator comprises two internal semi-circumferential fluid paths within said evaporator located on opposite diametrical sides of said stator.

2. An electric machine as described in claim 1 wherein:
said electric machine is constructed with said stator located radially inside said rotor, said rotor is supported by a hub located on only one axial end and said physical loop transfers heat energy out the opposite end as said hub by flowing out the internal cavity of said electric machine to said remote condenser.

3. An electric machine as described in claim 1 wherein:
said electric machine transfers stator resistive heat energy from a lower surface area density at said stator to a higher surface area density at said condenser.

4. An electric machine as described in claim 1 wherein:
said pre-bundled multiple individually insulated conductor strands are wrapped with a dielectric film which is bonded directly to said slotless ferromagnetic stator backiron.

5. An electric machine as described in claim 1 wherein:
said slotless ferromagnetic stator backiron has stator outer volume, Vs, and a stator outer surface area on the surface opposite to said magnetic air gap, SAs, and
said condenser has outer volume, Vc, and a condenser outer surface area, SAc, wherein both SAc>SAs and Vs>Vc.

6. An electric machine as described in claim 1 wherein:
said fluid in said evaporator is located substantially outside of the circumferentially traversing magnetic flux in said slotless ferromagnetic stator backiron.

7. An electric machine as described in claim 1 wherein:
said insulated conductor strands are compressed against said slotless ferromagnetic stator backiron and bonded with active length portions all lying in a single layer.

8. An electric machine for converting between electrical and rotary mechanical energy comprising:
a rotor that is journalled to rotate about an axis of rotation, and a stator is stationary adjacent to said rotor and magnetically exerts torque upon said rotor across a magnetic airgap in response to applied electric power;
said rotor comprising permanent magnets that generate magnetic flux across said magnetic airgap and through air core stator windings that are bonded in thermal contact to a slotless ferromagnetic stator backiron on the surface facing said magnetic airgap;

said air core stator windings are comprised of pre-bundled multiple individually insulated conductor strands that are electrically connected in parallel but are electrically insulated from each other along their lengths inside said magnetic airgap where they are bonded to said slotless ferromagnetic stator backiron said air core stator windings are cooled by a physical loop having an evaporator, a remote located condenser and connected by two fluid flow lines filled with two phase fluid comprising liquid and gas both traveling in the same direction around said physical loop;

said evaporator is constructed as an annulus co-annular with said rotor and located in thermal contact with said slotless ferromagnetic stator backiron and in thermal conduction indirectly with heat across said bond of said air core stator windings and through said slotless ferromagnetic stator backiron as heat is generated from said application of electric power;

said evaporator transfers heat from said slotless ferromagnetic stator backiron to said fluid through phase change energy of said fluid, and said fluid is passively circulated to said condenser where said phase change energy is released remotely by convection of heat to ambient air.

9. An electric machine as described in claim 8 wherein:
said pre-bundled multiple individually insulated conductor strands are wrapped with a dielectric film which is bonded directly to said slotless ferromagnetic stator backiron.

10. An electric machine as described in claim 8 wherein:
said electric machine is constructed with said stator located radially inside said rotor, said rotor is supported by a hub located on only one axial end and said physical loop transfers heat energy out the opposite end of said hub by flowing out the internal cavity of said motor to said condenser.

11. An electric machine as described in claim 8 wherein:
said slotless ferromagnetic stator has stator outer volume, Vs, and a stator outer surface area on surface opposite to said magnetic air gap, SAs, and
said condenser has outer volume, Vc, and a condenser outer surface area, SAc, wherein both SAc>SAs and Vs>Vc.

12. An electric machine as described in claim 8 wherein:
said electric machine transfers stator resistive heat energy from lower surface area density at said slotless ferromagnetic stator to a higher surface area density at said condenser.

13. An electric machine as described in claim 8 wherein:
wherein said evaporator includes an internal wick that pumps said fluid by capillary action and pumps said fluid in a path that comprises multiple turns about the diameter of said slotless ferromagnetic stator.

14. An electric machine as described in claim 8 wherein:
said electric machine transfers stator resistive heat energy from lower surface area density at said slotless ferromagnetic stator to a higher surface area density at said condenser.

15. A method for operating an electric machine to higher power densities in converting between electrical and rotary mechanical energy comprising:
journaling a rotor to rotate about an axis of rotation and fixing a stator stationary adjacent to said rotor that magnetically exerts torque upon said rotor across a magnetic airgap in response to applied electric power;
said rotor comprising permanent magnets that generate magnetic flux across said magnetic airgap and through slotless stator windings that are bonded in thermal contact to a slotless ferromagnetic stator backiron on the surface facing said magnetic airgap;

said slotless stator windings comprising pre-bundled multiple individually insulated conductor strands that are electrically connected in parallel but are electrically insulated from each other along their lengths inside said magnetic airgap where they are bonded to said slotless ferromagnetic stator backiron coupling said stator to a physical loop having an evaporator, a remote located condenser and connected by two fluid flow lines filled with two phase fluid comprising liquid and gas both traveling in the same direction around said physical loop;

said evaporator being constructed as an annulus co-annularly with said rotor and located radially proximate to stator and in thermal conduction with heat across said bond of said slotless stator windings and through said slotless ferromagnetic stator backiron as heat is generated from said application of electric power;

applying electric power to said slotless stator windings and said evaporator transferring heat from said slotless ferromagnetic stator backiron to said fluid through phase change energy of said fluid, and said fluid is passively circulating to said condenser where said phase change energy is released remotely by convection to ambient air, said evaporator transferring heat from said slotless ferromagnetic stator backiron to said fluid through phase change energy of said fluid, and said fluid is passively circulating to said condenser where said phase change energy is released remotely by convection of heat to ambient air, wherein said condenser is located a higher elevation than said stator.

16. An electric machine as described in claim 15 wherein:
said electric machine comprises an outer rotor with an inner stator, and a tensioned overwrap band in said magnetic airgap compresses the winding pattern of said air core stator windings against said slotless ferromagnetic stator backiron for increased heat transfer from said air core stator windings to said two phase fluid.

17. An electric machine as described in claim 15 wherein:
said dielectric tape wrapped around said bundles of strands comprises two layers of electrically insulating tape.

18. An electric machine as described in claim 15 wherein:
said insulated conductor strands are compressed against the said slotless ferromagnetic stator backiron and bonded with active length portions of all windings lying in a single layer in thermal conduction with said slotless ferromagnetic stator backiron.

19. An electric machine as described in claim 15 wherein:
said evaporator comprises two semi-circumferential fluid paths located on diametrically opposite surfaces of said stator.

20. An electric machine as described in claim 15 wherein:
said electric machine is constructed with said stator located radially inside said rotor, said rotor is supported by a hub located on only one axial end and said physical loop transfers heat energy out the opposite end of said hub by flowing out the internal cavity of said motor to said condenser.

21. An electric machine for converting between electrical and rotary mechanical energy comprising:

a rotor that is journalled to rotate about an axis of rotation, and a stator that is stationary adjacent to said rotor and magnetically exerts torque upon said rotor across a magnetic airgap in response to applied electric power, said rotor having a surface that is opposed to, and spaced apart from, a corresponding surface on said stator, said rotor surface and said stator surface defining said magnetic airgap therebetween;

said rotor comprising permanent magnets that generate magnetic flux across said magnetic airgap and through air core stator windings that are bonded in thermal contact to a slotless ferromagnetic stator backiron comprising said stator surface facing said magnetic airgap;

said air core stator windings are comprised of pre-bundled multiple individually insulated conductor strands that are electrically connected in parallel but are electrically insulated from each other along their lengths inside said magnetic airgap where they are bonded to said slotless ferromagnetic stator backiron said air core stator windings are cooled by a physical loop having an evaporator, a remote located condenser and connected by two fluid flow lines filled with two phase fluid comprising liquid and gas both traveling in the same direction around said physical loop;

said evaporator is constructed as an annulus co-annular with said rotor and located in thermal contact with said slotless ferromagnetic stator backiron and in thermal conduction indirectly with heat across said bond of said air core stator windings and through said slotless ferromagnetic stator backiron as heat is generated from said application of electric power;

said air core stator windings providing three layers of electrical insulation between said air core stator windings and ground comprising enamel on base magnet individual wire strands, dielectric tape wrapped around bundles of strands and a film adhesive layer between said dielectric tape and said slotless ferromagnetic stator backiron.

* * * * *